…

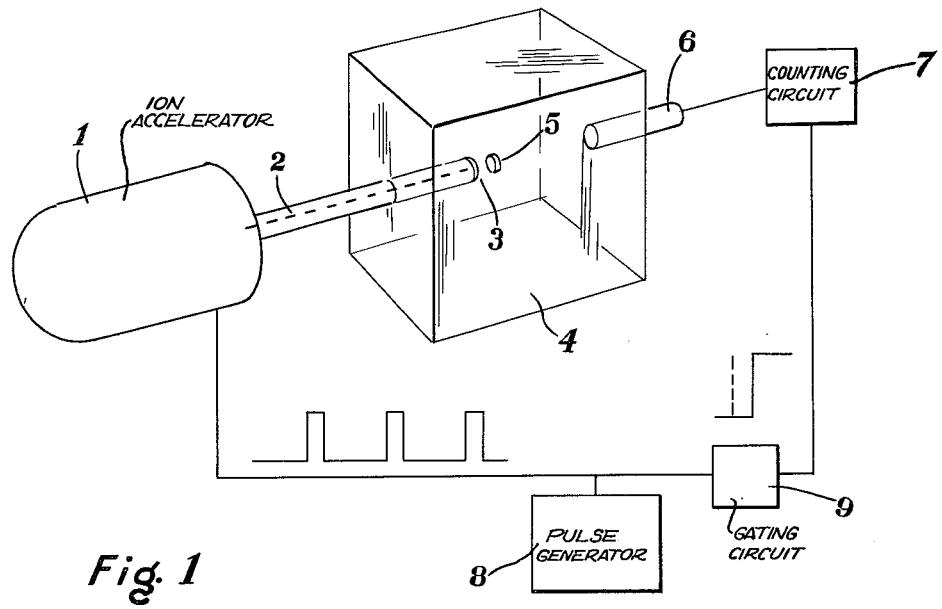
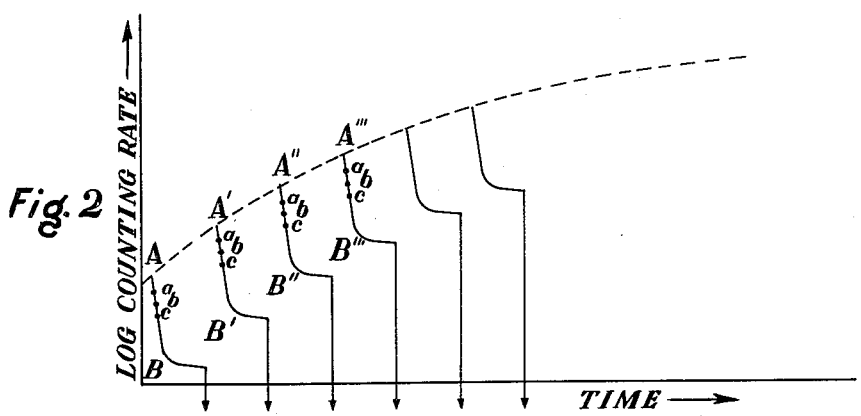
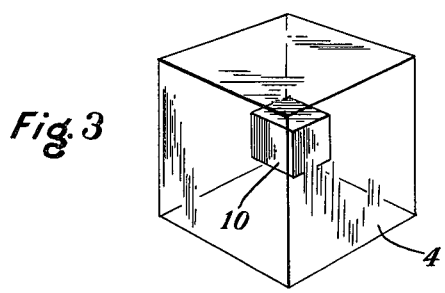
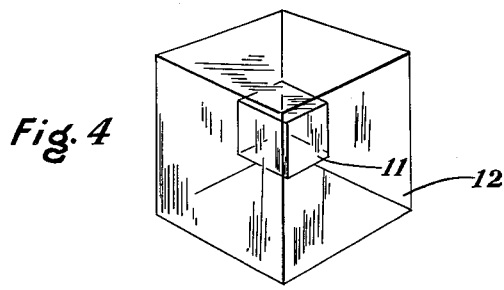

United States Patent Office 3,011,056
Patented Nov. 28, 1961

3,011,056
APPARATUS FOR NEUTRON
ACTIVATION ANALYSIS
Alfred J. Gale, Lexington, Mass., assignor to High Voltage Engineering Corporation, Burlington, Mass., a corporation of Massachusetts
Filed Oct. 1, 1957, Ser. No. 687,628
3 Claims. (Cl. 250—71.5)

This invention relates to neutron activation analysis, and in particular to a novel method of neutron activation analysis which, by using repeated neutron pulses, is capable of making use of very short half-lives, as well as relatively longer half-lives, together with apparatus for carrying out the method. In addition to using very short half lives, the invention comprehends the detection, in a neutron-activated sample, of a plurality of components which have different half-lives. The method may preferably be performed by means of the apparatus of the invention, which apparatus comprehends various forms and combinations of neutron moderators and scintillating materials to be described in detail hereinafter, as well as the electronic circuitry associated therewith.

Present methods of neutron activation analysis depend substantially on a more or less constant flux of neutrons, such as that provided by a pile or an isotopic source to which the sample under test is introduced and from which it is removed prior to counting. As a consequence of the time elapsed during the removal of the test specimen from the neutron activation region to the counting region, the very short half lives of many elements cannot be reliably used. Since the value of neutron activation analysis lies in the differentiation of "half lives" as well as intensities and radiation qualities, the use of very short half lives would enable the spectrum to be broadened. This is akin to a hypothetical situation in spectroscopic analysis wherein an initial limitation to, say, the red-end of the spectrum is broadened to include the rest of the visible spectrum and the ultraviolet. Since one of the values of neutron activation analysis is the rapidity with which useful results can be obtained, extension to include very short half lives is most important.

With the advent of powerful particle accelerators high instantaneous neutron fluxes can be obtained over short intervals by applying pulse techniques to the particle-accelerator neutron-source. In accordance with the invention, certain combined pulsed neutron-source and counting systems have been devised to take advantage of the production of neutrons from particle accelerators. Although in principle it is possible to obtain pulsed neutron beams from piles and isotopic sources by using "choppers," the resultant fluxes are generally much lower than those obtainable from particle accelerators.

The invention may best be understood from the following detailed description thereof, having reference to the accompanying drawing, in which:

FIG. 1 is a diagrammatic view illustrating a combined pulsed neutron source and counting system which are constructed in accordance with the invention and are adapted to carry out the method of the invention;

FIG. 2 is a graph in which the logarithm of the counting rate is plotted as a function of time;

FIG. 3 is a diagrammatic view showing a modified form of the moderator of FIG. 1; and FIG. 4 is a diagrammatic view showing another modified form of the moderator of FIG. 1.

A particle accelerator 1 directs high energy deuterons 2 at a beryllium target 3 and produces neutrons which become thermalized by a moderator 4. The thermalized neutrons activate a sample 5 which is positioned so as to be enclosed by the moderator 4. This is the normal procedure in neutron activation analysis. In accordance with the invention, however, the moderator 4 is optically transparent and is made to "scintillate" under the action of high energy particles and photons, so that it forms the head for a photomultiplier 6 and becomes, in combination with it, a scintillation counter.

By stopping the deuteron beam 2, and consequent sample activation, after a suitable interval, and simultaneously (or a further short interval later) allowing the counting circuit 7 to count, the activity, and in particular the short-lived activity, may be determined. Methods of shutting off beams and opening up counting circuits over accurately prescribed intervals by means of pulse generators as shown at 8 and gating circuits as shown at 9 is well known to electronically-inclined gentlemen.

The technique is applicable to the determination of both very short and relatively longer half-lives by using repeated pulses.

Suppose the sample can be activated to give two half lives, $T_1$ and $T_2$. Let us further suppose that the sample contains $N_1$ nuclei of one component which may after thermal neutron activation give rise to activity $A_1$ and $N_2$ nuclei of another component which may after thermal neutron activation give rise to activity $A_2$. Let the associated nuclear cross sections be $\sigma_1$ and $\sigma_2$, respectively, and let the instantaneous neutron flux be $F$. For clarity we will further suppose that $F$ is constant over the pulse interval and zero at all other times even though this is not strictly true.

Let us now repeatedly pulse the particle accelerator 1 in such a manner that the beam is on for $3/10$ second and off for 1 second, and let the counting circuit 7 count during the "accelerator off" intervals only.

The activity of the sample at the end of the first pulse is given by $$A' = A'_1 + A'_2 = F\sigma_1 N_1 (1 - e^{-.3\lambda_1})$$
$$+ F\sigma_2 N_2 (1 - e^{-.3\lambda_2}) d/\text{sec}.$$

at the end of the second pulse by $$A'' = A''_1 + A''_2 = F\sigma_1 N_1 (1 - e^{-.3\lambda_1}) e^{-1.3\lambda_1}$$
$$+ (1 - e^{-.3\lambda_1}) + F\sigma_2 N_2$$
$$[(1 - e^{-.3\lambda_2}) e^{-.3\lambda_2} + (1 - e^{-.3\lambda_2})]$$

and so on. See, for example, Lapp and Andrews, Nuclear Radiation Physics (2d ed.), Prentice-Hall, Inc. 1954 section 12.06, pages 353–358.

If the logarithm of the rate of counting be plotted versus time, a graph similar to that of FIG. 2 will result.

The slope of the steep lines AB, A'B' etc. is a property of the activity of short half-life $T_1$, and the envelope (shown as a dotted line) of the series is a property of the activity of longer half-life $T_2$. The half-lives $T_1$ and $T_2$ are deducible from the contours of the relevant lines. The longer half-life may be checked by limiting the particle accelerator operation to, say, 50 pulses (total time 65 seconds). Then, after 65.2 seconds the counter will be counting only the longer lived activity.

Many modifications of the apparatus shown in FIG. 1 are within the spirit and scope of the invention.

For instance, the outer surfaces of the transparent scintillating moderator 4 may be coated reflectively to increase counting efficiency.

In another modification of the invention, shown in FIG. 3, a region of opaque moderator 10 may surround the sample 5 to limit counting to gamma activity or to select counting of the higher energy beta rays. This might equally well be done in the external circuitry, by pulse height analysis techniques well-known by those skilled in the electronic art.

In another modification of the invention I place a geiger counter or scintillation counter or other useful detector close to the sample 5 and replace the triple function moderator 4 by a conventional moderator which need be neither transparent nor scintillating.

In still another modification of the invention, shown in FIG. 4, the moderator 11 may have no additional property, such as transparency or ability to scintillate, but may be enclosed in transparent scintillating material 12. In this case counting would be restricted to gamma radiation arising directly from the activated nuclei or from the beta radiation.

While the foregoing examples deal mostly with thermal neutrons, the method of the invention is, of course, applicable to activation by higher energy neutrons and activation by charged particles.

The curves in the graph of FIG. 2 are a measure of counting rate. Since the counting circuit 7 measures actual counts over a time interval determined by the gating circuit 9, it actually is a measure of the mean counting rate over that interval. Because of the small number of counts in such a short interval, it is preferable to take an average of several measurements over corresponding portions of several of the curves in the graph of FIG. 2 rather than to rely on a single such measurement. Thus, for example, referring to the graph of FIG. 2, the electron circuitry should be so arranged that the counter reads the number of counts over the interval $ab$ of curves $AB$, $A'B'$ and $A''B''$, and over the interval $bc$ of curves $A'''B'''$ and the next two curves, and so on. This technique is not necessary in measuring the initial activities at points $A$, $A'$, etc., because the quantity desired is not the initial activity at any one point, but the rate of rise of initial activity.

Having thus described the method of the invention, together with several embodiments of apparatus for carrying out the method, it is to be understood that although specific terms are employed, they are used in a generic and descriptive sense and not for purposes of limitation, the scope of the invention being set forth in the following claims.

I claim:

1. Apparatus for analyzing the chemical content of a sample comprising in combination means for producing a pulsed beam of ions, means for directing said ions onto a target adapted to produce neutrons upon bombardment by said ions, a moderator adapted to decelerate said neutrons so as to produce thermal neutrons, means for subjecting said sample to said thermal neutrons, means for measuring the rate of decay of the resultant radioactivity after cessation of each pulse, wherein said moderator comprises transparent material capable of scintillating in response to the presence of radio activity and thereby being adapted to assist in the necessary measurements of radio activity.

2. Apparatus in accordance with claim 1, wherein the region of said moderator in the vicinity of said sample is opaque.

3. Apparatus in accordance with claim 1, wherein the region of said moderator in the vicinity of said sample is non-scintillating.

References Cited in the file of this patent

UNITED STATES PATENTS

| | | |
|---|---|---|
| 2,509,344 | Herzog | May 30, 1950 |
| 2,744,199 | Juterbock et al. | May 1, 1956 |
| 2,763,788 | Herzog | Sept. 18, 1956 |
| 2,778,950 | Frey et al. | Jan. 22, 1957 |

FOREIGN PATENTS

| | | |
|---|---|---|
| 724,441 | Great Britain | Feb. 23, 1955 |